(12) United States Patent
Jung et al.

(10) Patent No.: US 9,944,189 B2
(45) Date of Patent: Apr. 17, 2018

(54) SYSTEM AND METHOD FOR USING SOLAR CELL

(71) Applicant: HYUNDAI MOTOR COMPANY, Seoul (KR)

(72) Inventors: Hae Yoon Jung, Seoul (KR); Won Jung Kim, Seoul (KR); Moon Jung Eo, Seoul (KR); Sung Geun Park, Seoul (KR); Sang Hak Kim, Seoul (KR); Mi Yeon Song, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/918,302

(22) Filed: Oct. 20, 2015

(65) Prior Publication Data

US 2016/0121738 A1    May 5, 2016

(30) Foreign Application Priority Data

Oct. 31, 2014   (KR) ........................ 10-2014-0149898

(51) Int. Cl.
*G06F 19/00*   (2011.01)
*B60L 11/18*   (2006.01)
(Continued)

(52) U.S. Cl.
CPC ............. *B60L 11/1809* (2013.01); *B60L 1/00* (2013.01); *B60L 8/003* (2013.01); *B60L 11/02* (2013.01);
(Continued)

(58) Field of Classification Search
CPC ........ B60L 11/1809; B60L 1/00; B60L 8/003; B60L 11/02; B60L 11/1851;
(Continued)

(56) References Cited

U.S. PATENT DOCUMENTS 6,439,658 B1    8/2002  Ganz et al.
8,544,575 B1 *  10/2013 Scaringe ................. B60K 6/40
                                                180/65.21
(Continued)

FOREIGN PATENT DOCUMENTS

JP      06-336933 A     12/1994
JP      2008-290513 A   12/2008
(Continued)

*Primary Examiner* — Ronnie Mancho
(74) *Attorney, Agent, or Firm* — McDermott Will & Emery LLP

(57) ABSTRACT

A system for using a solar cell includes a solar cell module configured to convert sunlight into electric energy, an engine operating circuit configured to convert mechanical energy generated by an engine operation of a vehicle into electric energy and provide the electric energy, a solar cell circuit configured to provide the electric energy generated through the solar cell module, a battery configured to be charged by electric energy provided by the solar cell circuit or the engine operating circuit, a load, and a controller of a vehicle. The controller is configured to control a connection of the circuits to the battery or to the load depending on a measured state of charge of the battery, driving of the vehicle, and acceleration of the vehicle. A method for using a solar cell is also disclosed.

10 Claims, 5 Drawing Sheets

(51) Int. Cl.
*H01M 10/46* (2006.01)
*B60L 11/02* (2006.01)
*B60L 8/00* (2006.01)
*B60L 1/00* (2006.01)

(52) U.S. Cl.
CPC ....... *B60L 11/1851* (2013.01); *H01M 10/465* (2013.01); *Y02E 10/542* (2013.01); *Y02T 10/70* (2013.01); *Y02T 10/7005* (2013.01); *Y02T 10/705* (2013.01); *Y02T 10/7072* (2013.01); *Y02T 10/7077* (2013.01); *Y02T 10/7083* (2013.01); *Y02T 10/7094* (2013.01); *Y02T 90/14* (2013.01); *Y10S 903/903* (2013.01)

(58) Field of Classification Search
CPC .... H01M 10/465; Y02E 10/542; Y02T 10/70; Y02T 10/7005
USPC ...................................................... 701/1, 22
See application file for complete search history.

(56) References Cited

U.S. PATENT DOCUMENTS

| | | | | |
|---|---|---|---|---|
| 8,800,701 | B1* | 8/2014 | Sadler | B60L 1/003 180/65.29 |
| 9,079,505 | B1* | 7/2015 | Hyde | G06Q 10/0631 |
| 9,123,035 | B2* | 9/2015 | Penilla | G06Q 20/18 |
| 9,389,007 | B1* | 7/2016 | McKay | F25B 27/00 |
| 9,410,823 | B2* | 8/2016 | Widmer | G01D 5/2006 |
| 9,561,730 | B2* | 2/2017 | Widmer | B60L 11/182 |
| 2009/0288896 | A1* | 11/2009 | Ichikawa | B60K 6/365 180/65.265 |
| 2012/0058377 | A1* | 3/2012 | Sastry | H01M 2/1077 429/94 |
| 2012/0096885 | A1 | 4/2012 | Mak et al. | |
| 2012/0161696 | A1* | 6/2012 | Cook | B60L 11/182 320/108 |
| 2013/0226379 | A1* | 8/2013 | Hirai | B60K 6/445 701/22 |
| 2013/0266827 | A1* | 10/2013 | Sastry | H01M 2/1077 429/7 |
| 2014/0095018 | A1* | 4/2014 | Atluri | B60L 1/00 701/36 |
| 2014/0114514 | A1* | 4/2014 | Crombez | B60W 10/06 701/22 |
| 2014/0200755 | A1* | 7/2014 | Sisk | B60L 11/12 701/22 |
| 2014/0216693 | A1* | 8/2014 | Pekarsky | B60H 1/00278 165/104.31 |
| 2014/0277869 | A1* | 9/2014 | King | B60H 1/00278 701/22 |
| 2015/0197163 | A1* | 7/2015 | Loftus | B60L 11/1809 320/134 |
| 2015/0239365 | A1* | 8/2015 | Hyde | B60L 11/1861 701/2 |
| 2017/0136885 | A1* | 5/2017 | Ricci | B60L 11/005 |
| 2017/0141368 | A1* | 5/2017 | Ricci | G01C 21/3673 |

FOREIGN PATENT DOCUMENTS

| | | |
|---|---|---|
| JP | 4320776 B2 | 8/2009 |
| JP | 2013-150497 A | 8/2013 |
| KR | 10-2004-0107957 A | 12/2004 |
| KR | 10-2008-0093369 A | 10/2008 |
| KR | 10-2010-0126077 A | 12/2010 |
| KR | 10-2011-0004192 A | 1/2011 |
| KR | 10-2011-0045556 A | 5/2011 |
| KR | 10-2012-0086923 A | 8/2012 |
| KR | 10-1319433 B1 | 10/2013 |

* cited by examiner

SYSTEM AND METHOD FOR USING SOLAR CELL

CROSS-REFERENCE TO RELATED APPLICATION

This application claims under 35 U.S.C. § 119(a) the benefit of priority to Korean Patent Application No. 10-2014-0149898 filed on Oct. 31, 2014, the entire contents of which are incorporated herein by reference.

TECHNICAL FIELD

The present disclosure relates to a system and a method for using a solar cell for a vehicle. More particularly, it relates to a system and a method for using a solar cell for variously using electric energy output from a solar cell by including the solar cell, which converts sunlight into electric energy, in the vehicle.

BACKGROUND

A solar cell is a photoelectric conversion device which converts sunlight into electric energy. As the solar cell, a single crystalline silicon solar cell or a polycrystalline silicon solar cell has been mainly used so far. However, the silicon solar cell has high manufacturing cost due to the use of large, expensive equipment and expensive materials at the time of manufacturing the silicon solar cell and has a limitation in improving conversion efficiency of solar energy into electric energy, and as a result, new alternatives have been sought to substitute for the silicon solar cell. As an alternative of the silicon solar cell, a solar cell which may be manufactured using inexpensive organic materials has received attention. In particular, a dye-sensitive solar cell which may be manufactured very cheaply has received much attention.

Unlike other energy sources, the solar cell is infinite and environmentally-friendly. As a result, importance of the solar cell has increased and applications thereof are becoming more frequent as time goes on. To keep pace with the trend, car makers have developed and released vehicles in which the solar cell and a system for using electric energy output from the solar cell are equipped.

However, the vehicle in which the solar cell is equipped has a problem in utilizing the electric energy output from the solar cell.

US Patent Laid-Open Publication No. 2012-0096885 (hereinafter, Document 1) which is the related art document discloses a method for operating an air conditioning system using power from a solar cell.

However, Document 1 does not provide an alternative of a method for determining charging conditions of a battery for a vehicle using power generated from a solar cell or charging the battery using power generated from an engine while driving. That is, Document 1 does not disclose a method for effectively using power generated from a solar cell.

The above information disclosed in this Background section is only for enhancement of understanding of the background of the invention and therefore it may contain information that does not form the prior art that is already known in this country to a person of ordinary skill in the art.

SUMMARY

Embodiments of the present invention have been made in an effort to solve the above-described problems associated with prior art and to provide a system and a method for using a solar cell capable of increasing fuel efficiency and efficiently operating power by, in certain embodiments, limiting a charging frequency of a battery using an alternator of an engine at the time of charging the battery since the battery is charged with electric energy generated from the solar cell or loads are supplied with electric energy depending on a setting of a controller, in the case of a vehicle in which the solar cell is equipped.

In one aspect, a system for using a solar cell, includes a solar cell module configured to convert sunlight into electric energy, an engine operating circuit configured to convert mechanical energy generated by an engine operation of a vehicle into electric energy and provide the electric energy, a solar cell circuit configured to provide the electric energy generated through the solar cell module, a battery configured to be charged by electric energy provided by the solar cell circuit or the engine operating circuit, a load, and a controller of a vehicle. The controller is configured to control a connection of the circuits to the battery or to the load depending on a measured state of charge of the battery, a driving of the vehicle, and an acceleration of the vehicle.

In certain embodiments, the controller may be configured to control the solar cell circuit to provide the electric energy generated from the solar cell module to the load depending on a driving request of the load when the state of charge of the battery is equal to or more than the first setting value when the engine of the vehicle stops.

In certain embodiments, the controller may be configured to connect the solar cell circuit to the battery to charge the battery when the state of charge of the battery is smaller than the first setting value or when there is no driving request of the load when the engine of the vehicle stops.

In certain embodiments, the controller may be configured to connect the engine operating circuit to charge the battery when the vehicle is accelerated.

In certain embodiments, the controller may be configured to connect the solar cell circuit to charge the battery when the vehicle is decelerated or is driven at a constant speed.

In certain embodiments, the controller may be configured to measure power generated from the solar cell module and to connect the engine operating circuit to charge the battery when the power generated from the solar cell module is smaller than a second setting value.

In another aspect, a method for using a solar cell, including: a) determining whether an engine of a vehicle is operated; b) determining a driving request of a load stored in a controller when the engine of the vehicle is stopped; c) operating the load by connecting a solar cell circuit to the load when there is the driving request of the load; and d) charging the battery up to a maximum state of charge by connecting the solar cell circuit to the battery when there is no driving request of the load.

In certain embodiments, step a) of determining whether the engine of the vehicle is operated may include: a1) determining whether the vehicle is accelerated; a2) charging the battery by connecting an engine operating circuit to the battery, when the vehicle is accelerated; and a3) charging the battery by connecting the solar cell circuit to the battery when the vehicle is driven at a constant speed or decelerated.

In certain embodiments, the method may further include: in step a3), measuring power generated from the solar cell module and connecting the engine operating circuit to charge the battery when the generated power is smaller than a second setting value.

In certain embodiments, step b) of determining the driving request of the load may include: b1) determining whether an inside temperature of the vehicle is equal to or greater than 30° C. when the state of charge of the battery is equal to or greater than a first setting value; b2) operating an air conditioner when the inside temperature of the vehicle is equal to or greater than 30° C. and the state of charge of the battery is equal to or greater than the first setting value; b3) determining whether it rains outside the vehicle; and b4) opening a sun roof when it does not rain outside the vehicle.

According to certain exemplary embodiments of the present invention, it is possible to increase the fuel efficiency at the time of charging the battery, by charging the battery using the alternator when the vehicle is accelerated while the engine of the vehicle in which the solar cell is equipped is driven or charging the battery depending on the power generated from the battery when the vehicle is decelerated or is driven at a constant speed.

In certain embodiments, it is also possible to use power without changing the charge amount of the battery by operating the loads using the power generated from the solar cell depending on the setting of the driver or the request of the loads in the state in which the engine of the vehicle stops.

According to certain exemplary embodiments of the present invention, it is possible to provide a pleasant inside temperature for the driver in the vehicle by controlling the air conditioner which is included in one example of the load, and the heat rays, since the loads may be operated by the power generated from the solar cell.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
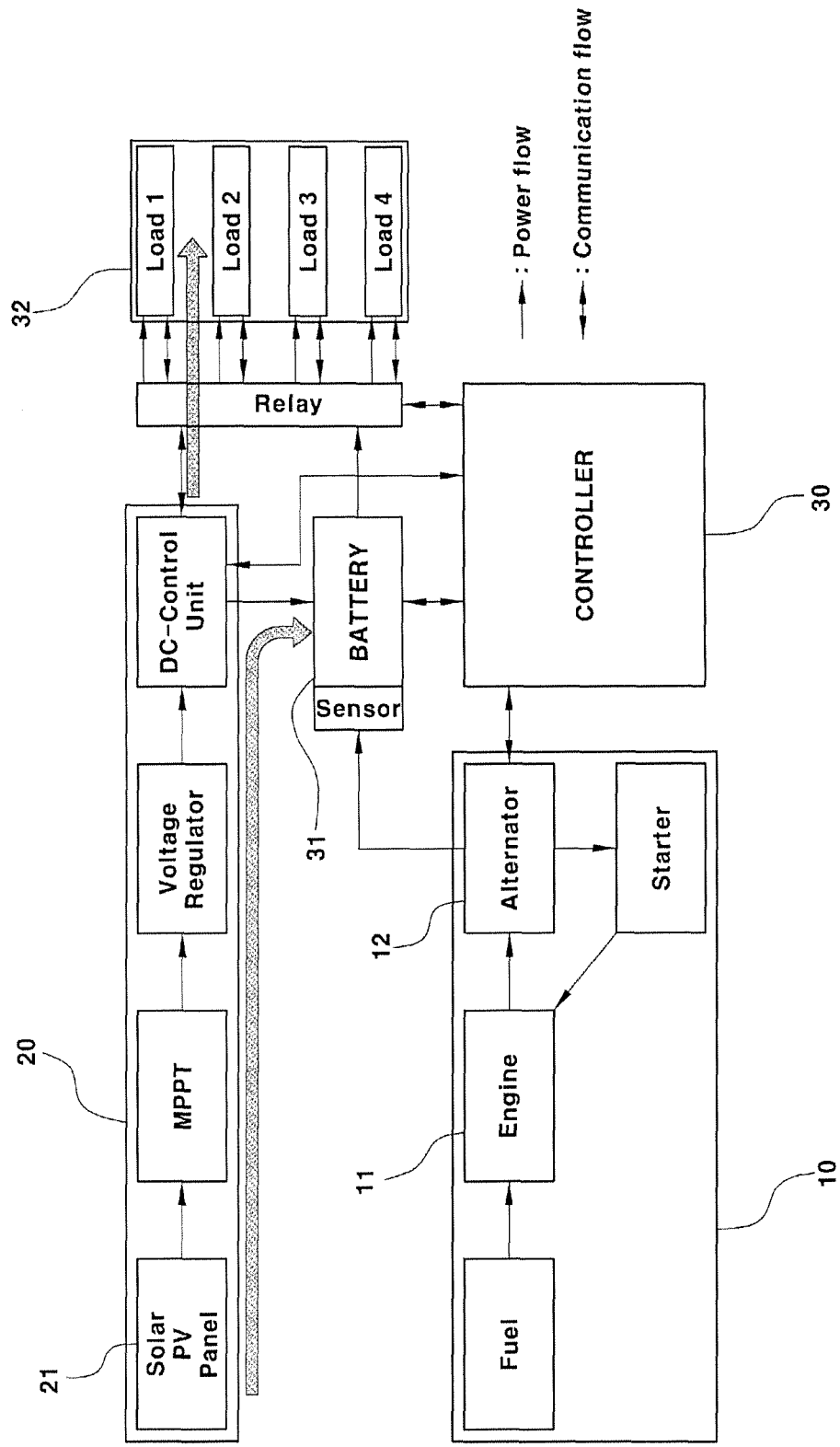
FIG. 1 is a diagram illustrating a system for charging a battery or operating loads using a solar cell circuit when an engine stops.

Reference numerals set forth in the Drawings includes reference to the following elements as further discussed below:

| | |
|---|---|
| 10: engine operating circuit | 11: engine |
| 12: alternator | 20: solar cell circuit |
| 21: solar cell module | 30: controller |
| 31: battery | 32: load |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention so as to be easily practiced by a person of ordinary skill in the art to which the present invention pertains will be described in detail with reference to the accompanying drawings.

Certain embodiments of the present invention relate to a power operation of a vehicle in which a solar cell is mounted and provides a solar cell system which operates power generated from a solar cell depending on setting of a driver or a request of a load 32 while an engine 11 of the vehicle stops. Further, in certain embodiments, the present disclosure provides a technology of using electric energy generated from a solar cell module 21 when a vehicle is decelerated or is driven at a constant speed. Therefore, an effect of increasing fuel efficiency depending on driving of an engine 11 is obtained by providing an operation of electric energy generated from a solar cell module 21.

The present disclosure relates to a system of a vehicle including a solar cell module 21 which converts sunlight into electric energy. In certain embodiments, the solar cell may be mounted in a loop channel of the vehicle. In certain embodiments, an example of the solar cell which is mounted in the loop channel may include an amorphous silicon solar cell or a crystalline silicon solar cell. In certain embodiments, a solar cell may be configured by individually using compound based solar cells such as a dye-sensitive solar cell, an amorphous silicon solar cell, a perovskite-based solar cell, an organic solar cell, a cadmium-telluride (CdTe) solar cell, and a copper-indium-gallium-selenium (CIGS) solar cell or using a combination thereof.

FIG. 1 illustrates a circuit configuration of a vehicle in which a solar cell is equipped. According to an exemplary embodiment of the present invention, the circuitry of the vehicle includes an engine operating circuit 10 including an alternator 12 which is connected to an engine 11 of a vehicle according to the exemplary embodiment of the present invention and may convert mechanical energy generated from the engine 11 into electric energy. In addition, in certain embodiments, the circuitry of the vehicle includes a solar cell circuit 20 which includes the solar cell module 21, a maximum power point tracking (MPPT) controller for controlling power generated from the solar cell, and a DC controller.

In certain embodiments, the battery, which is connected to a solar cell circuit 20 and an engine driving circuit may include a sensor which may measure a state of charge of a battery 31. In certain embodiments, the sensor which measures the state of charge of the battery 31 may transmit the measured value to a controller. According to an exemplary embodiment of the present invention, in the case of the battery, the battery 31 has a maximum state of charge of 12V. However, exemplary embodiments of the present invention may use any battery 31 which may be equipped in the vehicle.

In certain embodiments, the controller may control a connection between the solar cell circuit and the engine driving circuit 11. In addition, in certain embodiments, the controller may receive the measured value of the state of charge of the battery 31 and may charge the battery 31 by the connection with each circuit. Further, the controller may be connected to the load 32 to control an operation of the load 32 and may be connected to a plurality of sensors depending on a driving request of the load 32 to collect and store data measured by the plurality of sensors.

The controller according to the exemplary embodiment of the present invention determines whether the engine 11 of the vehicle is operated and whether the vehicle is decelerated or accelerated by an accelerator sensor of the vehicle. Further, in certain embodiments, the controller stores a driving request condition of the load 32 and if it is determined that the condition is satisfied, connects the solar cell circuit 20 to the load 32. According to an exemplary embodiment of the present invention, the controller operates an air conditioner as the load 32 when an inside temperature of a vehicle exceeds 30° C., in the case in which the state of charge of the battery 31 is equal to or more than a first setting value stored in the controller 30 in the state in which the engine 11 stops. In addition, the controller includes the condition that a sun roof of the load 32 is opened to provide indoor ventilation when it does not rain and therefore includes the above set conditions.

In certain embodiments, the controller includes the charging condition of the battery 31 and therefore connects the engine operating circuit 10 to the battery 31 depending on the acceleration condition of the vehicle to charge the battery 31 and connects the solar cell circuit 20 to the battery 31 depending on the deceleration condition or the constant speed driving condition of the vehicle to charge the battery 31. However, in certain embodiments, when the controller connects the solar cell circuit 20 to the battery 31 depending on the deceleration condition or the constant speed driving condition to charge the battery 31, power generated from the solar cell circuit 20 may be measured, and when the power generated from the solar cell circuit 20 is lower than a second setting value which is previously set in the controller, the controller connects the engine operating circuit 10 to the battery 31 to charge the battery 31. In this manner, a maximum battery capacity of the battery unit is maintained.

Figure 2:
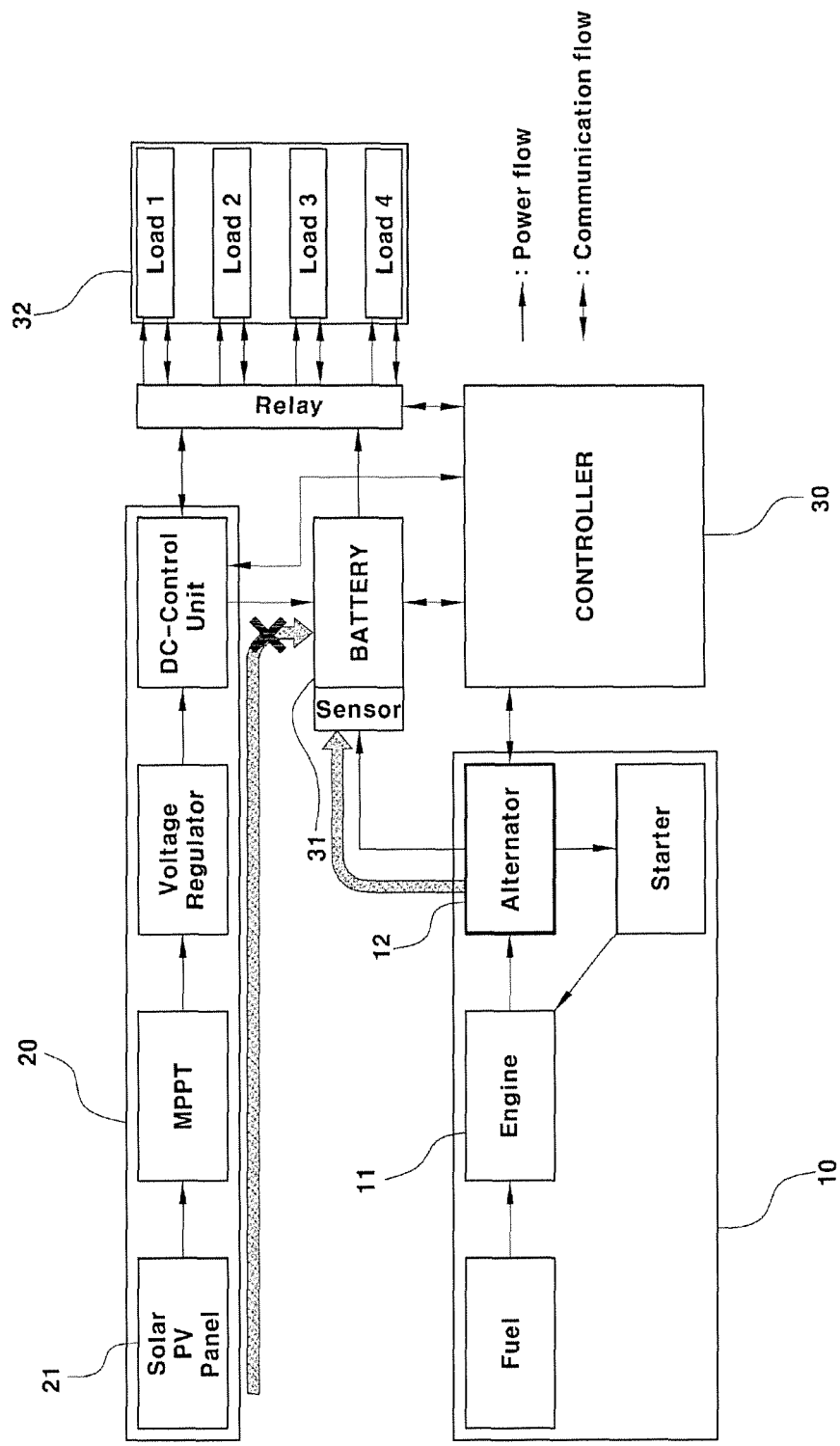
FIG. 2 is a diagram illustrating a system for charging a battery using an alternator of an engine operating circuit when a vehicle is accelerated.

FIG. 2 illustrates a system for charging the battery 31 when the vehicle is accelerated. In certain embodiments, the alternator 12 which is connected to the engine 11 converts mechanical energy of the engine 11 into electric energy while the vehicle is accelerated and charges the battery 31 through the engine operating circuit 10. In this case, in certain embodiments, to prevent the redundant charging of the battery 31, the configuration of the solar cell circuit 20 maintains an opened state along with the battery 31 and therefore the battery 31 is not redundantly charged by the solar cell circuit 20.

Figure 3:
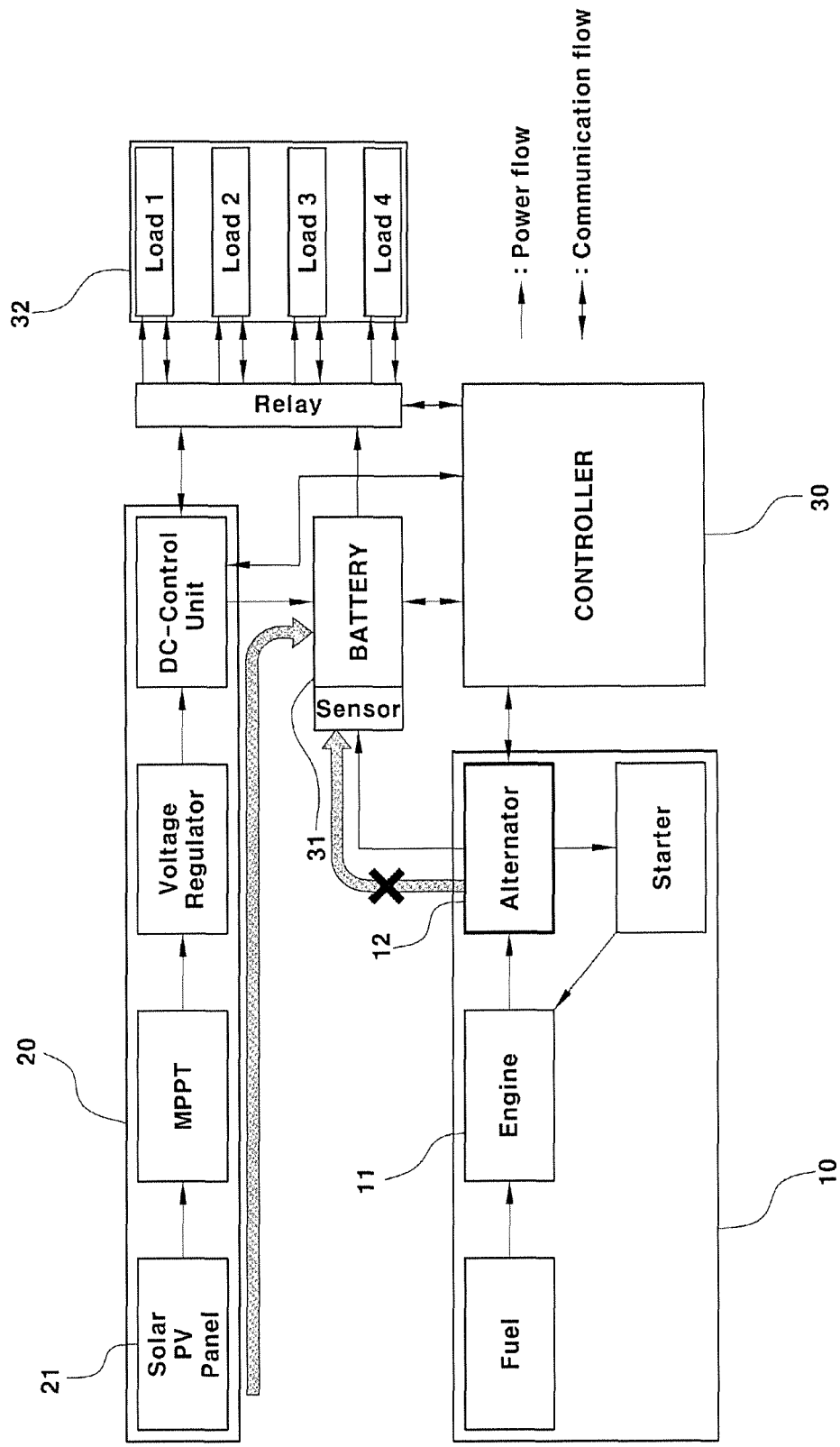
FIG. 3 is a diagram illustrating a system for charging a battery using the solar cell circuit when a vehicle is driven at a constant speed or is decelerated.

FIG. 3 illustrates a system for charging the battery 31 at the time of the deceleration driving of the vehicle or the constant speed driving of the vehicle. As described above, since the excessive charging of the battery 31 is not required in the deceleration driving or constant speed driving of the vehicle, in certain embodiments, when the vehicle is decelerated or is driven at a constant speed, the controller 30 connects the solar cell circuit 30 to the battery 31 to charge the battery 31 using the electric energy generated from the solar cell. Further, fuel consumption due to the driving of the engine 11 may be saved by preventing redundant charging and reducing a charging frequency of the alternator 12 using the engine 11.

Figure 4:
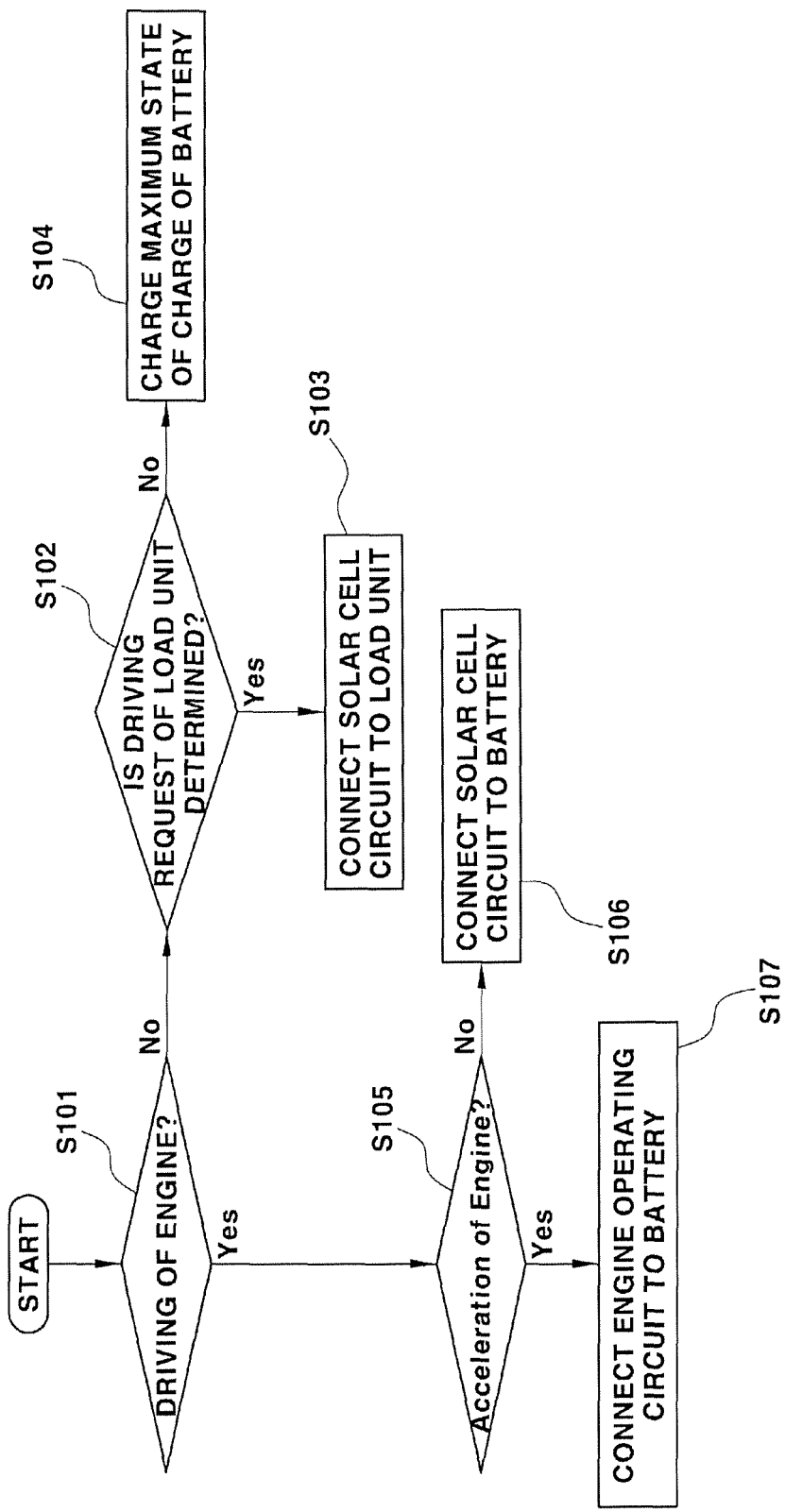
FIG. 4 is a flow chart of a method for using a solar cell.

FIG. 4 illustrates a flow chart of a method for using power of a solar cell of a vehicle.

It is determined whether the engine 11 of the vehicle is driven (S101) and it is determined whether the driving request of the load 32 stored in the controller 30 is requested when the engine 11 is stopped (S102). If it is determined that the driving of the load 32 is requested, according to an exemplary embodiment of the present invention, the step of determining the driving request of the load may include opening an operation of the air conditioner and an opening operation of the sun roof by a setting of a user when the state of charge of the battery 31 is equal to or more than the first setting value. However, the load is not limited to an air conditioner and a sun roof but may be any other load that uses electric energy. When the operation condition of the load 32 is set, the load 32 is operated using the electric energy generated from the solar cell module 21 by connecting the solar cell circuit to the load 32 (S103). When the driving request of the load 32 is not set, the solar cell circuit is connected to the battery 31 to maintain the maximum state of charge of the battery 31 (S104).

In certain embodiments, when the engine 11 of the vehicle is driven, it is determined whether the vehicle is accelerated (S105). If it is determined that the vehicle is accelerated, since the engine operating circuit 10 is connected to the battery 31 (S107), the alternator 12 as the configuration of the engine operating circuit 10 converts the mechanical energy of the engine 11 into electric energy to charge the battery 31. In certain embodiments, when the vehicle is decelerated or is driven at a constant speed, the solar cell circuit 20 is connected to the battery 31 to let the electric energy generated from the solar cell module 21 charge the battery 31 (S106).

At the time of determining the driving request of the load 32, the operation setting is input or set depending on the user's intention. According to an exemplary embodiment of the present invention, the load 32 is operated when the inside temperature is equal to or more than 30° C. in the state in which the vehicle stops. In addition, in certain embodiments, since the state of charge of the battery 31 is determined depending on the determination of the driving request of the load 32, when the state of charge of the battery 31 is equal to or less than the first setting value, the load 32 is not operated even though there is the input or setting of the user. This is to maintain the state of charge of the battery 31 at the first setting value or more. The load 32 may include, for example, one or more of a radio, an air cleaner, a hot ray sheet, a sun roof motor, and an air conditioner. However, the load is not limited to the above examples and may include other loads that are configured to use electric energy.

Figure 5:
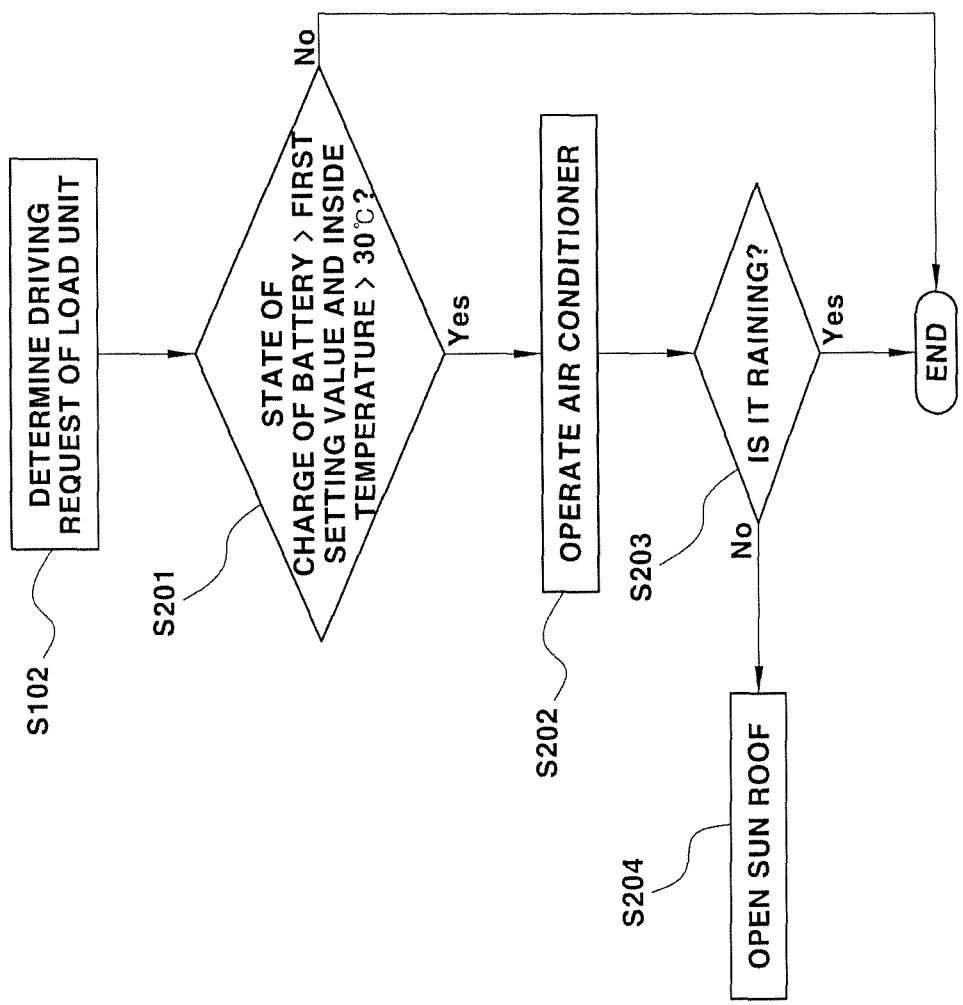
FIG. 5 is a flow chart of determining and operation conditions of loads depending on inside temperature and a state of charge of a battery.

FIG. 6 illustrates the determination of the driving request of the load 32 according to an exemplary embodiment of the present invention. This configures the connection between the solar cell circuit 20 and the load 32 depending on the inside temperature in the state in which the engine 11 of the vehicle is stopped. In determining the driving request of the load 32 of FIG. 5, it is determined whether the battery 31 has a state of charge which is equal to or more than the first setting value in the state in which the engine 11 of the vehicle stops and the inside temperature is higher than 30° C. If it is determined that the state of charge of the battery 31 is larger than the first setting value and the inside temperature of the vehicle is higher than 30° C. (S201), the controller 30 connects the solar cell circuit 20 to the load 32 to operate the load 32. In the exemplary embodiment including the inside temperature condition, the load 32 includes the air conditioner of the vehicle. Therefore, when the operation condition of the load 32 is satisfied, the air conditioner is operated (S202).

In certain embodiments, when the air conditioner of the vehicle is operated, a rain sensor measures the external environment of the vehicle to determine whether it rains (S203). When it does not rain, in certain embodiments, the controller 30 operates the sun roof motor to open the sun roof, thereby performing the outside ventilation of the vehicle (S204).

In addition, although the exemplary embodiments of the present invention are described above in detail, the protection scope of the present invention is not limited thereto. Therefore, various changes and improved forms by those skilled in the art using basic concepts of the present invention defined in the following claims belong to the protection scope of the present invention.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for using a solar cell, comprising:
   a solar cell module configured to convert sunlight into electric energy;
   an engine operating circuit configured to convert mechanical energy generated by an engine operation of a vehicle into electric energy and provide the electric energy;
   a solar cell circuit configured to provide the electric energy generated through the solar cell module;
   a battery configured to be charged by electric energy provided by the solar cell circuit or the engine operating circuit;
   a load; and
   a controller of a vehicle, the controller configured to control a connection of the circuits to the battery or to the load depending on a measured state of charge of the battery, driving of the vehicle, and acceleration of the vehicle,
   wherein the battery is selectively connected to the solar cell circuit for charging, and the load is selectively connected to the solar cell circuit for transferring the electric energy of the solar cell circuit to the load without connection of the battery to the solar cell depending on a driving condition of the vehicle.

2. The system of claim 1, wherein the controller is configured to control the solar cell circuit to provide the electric energy generated from the solar cell module to the load depending on a driving request of the load when the state of charge of the battery is equal to or greater than a first setting value when the engine of the vehicle stops.

3. The system of claim 2, wherein the controller is configured to connect the solar cell circuit to the battery to charge the battery when the state of charge of the battery is smaller than the first setting value or when there is no driving request of the load when the engine of the vehicle stops.

4. The system of claim 1, wherein the controller is configured to connect the engine operating circuit to charge the battery when the vehicle is accelerated.

5. The system of claim 1, wherein the controller is configured to connect the solar cell circuit to charge the battery when the vehicle is decelerated or is driven at a constant speed.

6. The system of claim 5, wherein the controller is configured to measure power generated from the solar cell module and to connect the engine operating circuit to charge the battery when the power generated from the solar cell module is smaller than a second setting value.

7. A method for using a solar cell, comprising:
   a) determining whether an engine of a vehicle is operated;
   b) determining a driving request of a load stored in a controller when the engine of the vehicle is stopped;
   c) operating the load by supplying electric energy of a solar cell circuit to the load without connection of a battery to the solar cell when the driving request of the load is present; and
   d) charging the battery up to a maximum state of charge by connecting the solar cell circuit to the battery when there is no driving request of the load.

8. The method of claim 7, wherein step a) of determining whether the engine of the vehicle is operated includes:
   a1) determining whether the vehicle is accelerated;
   a2) charging the battery by connecting an engine operating circuit to the battery, when the vehicle is accelerated; and
   a3) charging the battery by connecting the solar cell circuit to the battery when the vehicle is driven at a constant speed or decelerated.

9. The method of claim 8, wherein: step a3) further includes:
   measuring power generated from the solar cell module and connecting the engine operating circuit to charge the battery when the generated power is smaller than a second setting value.

10. The method of claim 7, wherein step b) of determining the driving request of the load includes:
   b1) determining whether an inside temperature of the vehicle is equal to or greater than 30° C. when the state of charge of the battery is equal to or greater than a first setting value;
   b2) operating an air conditioner when the inside temperature of the vehicle is equal to or greater than 30° C. and the state of charge of the battery is equal to or greater than the first setting value;
   b3) determining whether it rains outside the vehicle; and b4) opening a sun roof when it does not rain outside the vehicle.

* * * * *